United States Patent [19]

Serdiuk et al.

[11] Patent Number: 5,326,815

[45] Date of Patent: Jul. 5, 1994

[54] POLYURETHANE COATING COMPOSITION DERIVED FROM POLYESTER POLYOL CONTAINING LONG-CHAIN ALIPHATIC POLYOL

[75] Inventors: Paul Serdiuk, Warren; Alan L. Steinmetz, Milford, both of Mich.

[73] Assignee: BASF Corporation, Southfield, Mich.

[21] Appl. No.: 954,733

[22] Filed: Sep. 29, 1992

[51] Int. Cl.⁵ .................... C08J 3/00; C08K 3/20; C08L 75/00
[52] U.S. Cl. ................... 524/591; 524/539; 524/839; 524/840
[58] Field of Search ............. 524/591, 839, 840, 539

[56] References Cited

U.S. PATENT DOCUMENTS

| | | | |
|---|---|---|---|
| 4,546,120 | 10/1985 | Peerman et al. | 528/75 |
| 4,791,168 | 12/1988 | Salatin et al. | 524/601 |
| 4,794,147 | 12/1988 | Savino et al. | 525/440 |

*Primary Examiner*—Paul R. Michl
*Assistant Examiner*—P. Niland
*Attorney, Agent, or Firm*—Paul L. Marshall

[57] ABSTRACT

A coating composition is disclosed comprising:
 (a) an aqueous medium,
 (b) an water-dispersible polyurethane resin that is the reaction product of a mixture comprising:
  (1) a hydroxy-functional polyester component that is the reaction product of a mixture comprising a carboxylic acid component comprising at least two carboxylic acid functional groups, a long-chain aliphatic polyol having 18 to 60 carbon atoms, and a short-chain polyol having 12 or fewer carbon atoms,
  (2) a multifunctional compound having at least one active hydrogen group and at least one water-stabilizing group,
  (3) an active hydrogen-containing capping or chain extending agent, and
  (4) a polyisocyanate, and
 (c) an aminoplast crosslinking agent.

19 Claims, No Drawings

POLYURETHANE COATING COMPOSITION DERIVED FROM POLYESTER POLYOL CONTAINING LONG-CHAIN ALIPHATIC POLYOL

FIELD OF THE INVENTION

This invention relates to coating compositions, and particularly to waterborne polyurethane coating compositions for use in multilayer coatings.

BACKGROUND OF THE INVENTION

Multi-layer systems have been utilized to coat automobiles for a number of years, but the early development of these systems necessarily employed organic solvents. As environmental regulations became more stringent, and the cost of organic solvents rose, organic-borne basecoat systems became less desirable. The recent research emphasis in the area of multi-layer systems, especially basecoat systems has focused on the development of water-borne systems for multi-layer coatings.

The shift from organic solvents to water for dispersing and applying resins in multi-layer systems solved many of the environmental and cost problems associated with the use of organic solvents. Water-borne systems, however, have resulted in other problems.

The application of a multi-layer coating to an automobile body, for example, is greatly facilitated by a system that provides for drying of solvent after the application of a coating. This is typically accomplished by flashing underlying coatings such as the basecoat prior to application of the topcoat layer(s). In a flashing operation, the coating is exposed to air, optionally at elevated temperature, for a certain period of time. The time and temperature of the exposure is usually not sufficient to provide any significant curing to the basecoat, but is sufficient to drive enough solvent from the coating to avoid problems caused by excess solvent being trapped under the topcoat layer(s).

By facilitating drying, the time between coatings would be diminished, resulting in manufacturing efficiencies and lower energy costs. In addition, there would be a reduced need for a cool-down zone after drying which would further the manufacturing efficiencies. However, when the solvent for a coating composition is water, the amount of time required for driving off the water is often significantly greater than for organic solvent systems. It is thus desireable to produce a waterborne basecoat composition that could be dried in a period of time short enough to maintain manufacturing efficiency.

SUMMARY OF THE INVENTION

The present invention is directed to polyurethane resins that can be used in waterborne basecoat compositions of multi-layer coating systems.

According to the present invention, there is provided a coating composition comprising:
(a) an aqueous medium,
(b) an water-dispersible polyurethane resin that is the reaction product of a mixture comprising:
(1) a hydroxy-functional polyester component that is the reaction product of a mixture comprising a carboxylic acid component comprising at least two carboxylic acid functional groups, a long-chain aliphatic polyol having greater than 18 and less than 60 carbon atoms, and a short-chain polyol having 12 or fewer carbon atoms,
(2) a multifunctional compound having at least one active hydrogen group and at least one water-stabilizing group,
(3) an active hydrogen-containing capping or chain extending agent, and
(4) a polyisocyanate, and
(c) an aminoplast crosslinking agent.

The coating compositions of this invention are shown to possess the qualities of being quick-drying after application. Furthermore, the coating compositions of this invention also exhibit superior coating characteristics, for example, good metallic effects such as very favorable arrangement, fixation, and flip effect of the metallic pigments in the paint film. When non-metallic pigments are used, the resins of the present invention exhibit excellent decorative effect.

DESCRIPTION OF THE PREFERRED EMBODIMENTS

The present invention relates to a water-dispersible polyurethane resin produced by reacting an OH-functional polyester component with a mixture of a polyisocyanate-containing compound, a multifunctional compound having at least one active hydrogen functionality and at least one water-stabilizing group, and optionally, an additional component comprising a compound having at least two active hydrogen containing moieties. The polyester component is derived from a carboxylic acid compound, a long-chain aliphatic polyol of greater than 18 and less than 60 carbon atoms, and a short-chain polyol of 12 or fewer carbon atoms. The resulting polyurethane intermediate has terminal isocyanate groups or active hydrogen-containing moieties, depending upon the stoichiometry of the polyester mixture described above.

An especially preferred embodiment of the polyurethane resins of the present invention relates to the formation of a urethane product in which the intermediate polyurethane resin described above has free isocyanate groups at the terminal positions of the polyurethane resin. The isocyanate groups are then capped with an excess of a polyfunctional alcohol having at least 2 alcohol groups, and preferably at least 3 alcohol groups.

The particular characteristics of the polyurethane resins are determined by the components of the polyester resin. It has unexpectedly been discovered that polyester resins produced from a polyol component comprised of at least about 50% by weight of a long chain fatty polyol acid having from 18 to 60 carbon atoms can be formulated into water-dispersible polyurethane coating resins exhibiting particularly favorable low flash and quick drying properties for water borne basecoat resins.

The polyol component of the polyester is, of course, important to the invention and is comprised of a mixture of at least about 50% by weight of a long chain polyol component having between 18 and 60 carbon atoms. Preferably, the long chain polyol is a diol, and most preferably, the diol is a C36 dimeric diol, also known as dimer alcohol or dimer fatty alcohol. Where the long chain polyol makes up less than 100% of the polyol component, the polyol component is also comprised of one or more short-chained polyols.

Preferably, the long chain polyol comprises between 50 and 80% by weight of the polyol component of the polyester polyol. In the principal resin (major vehicle)

the long chain polyol component comprises about 75–80% of the polyester resin and in the grind resin, the long chain polyol comprises about 50% by weight of the polyester resin. Generally, the higher the percentage of long chain polyol, the better the quick-drying or flash off characteristics of the final polyurethane resin. However, the advantageous flash-off characteristics must be balanced with the effect that the change in the polyol component has on the metallic effects, durability and other characteristics of the resin, including, in the case of grind resin, the ability to accomodate pigment.

These long-chain or fatty alcohols may be readily produced by hydrogenation (reduction) of the corresponding well-known fatty acids. Alternatively, unsaturated higher fatty alcohols (e.g., having 8 to 22 carbon atoms) can be dimerized or trimerized to form longer-chain polyols. Preferably, the long chain polyol is a diol and more preferably, the diol is a C36 dimeric diol, also known as dimer alcohol or dimer fatty alcohol. Dimer fatty alcohol may be readily produced by the hydrogenation (reduction) of dimer fatty acid.

Examples of shorter polyols that could be used in conjunction with the long chain polyol include alkylene glycols, such as ethylene glycol, propylene glycol, butylene glycol, and neopentyl glycol, 1,6-hexanediol and other glycols such as hydrogenated bisphenol A, cyclohexane dimethanol, caprolactone diol (i.e., the reaction product of caprolactone and ethylene glycol), hydroxyalkylated bisphenols, and the like. However, other diols of various types and, as indicated, polyols of higher functionality may also be utilized. Such higher functional alcohols can include, for example, trimethylolpropane, trimethylolethane, pentaerythritol, and the like, as well as higher molecular weight polyols.

The low molecular weight diols which are preferred in the instant invention are known in the art. They have hydroxy values of 200 or above, usually within the range of 1500 to 200. Such materials include aliphatic diols, particularly alkylene polyols containing from 2 to 12 carbon atoms. Examples include ethylene glycol, 1,4-butanediol, cycloaliphatic diols such as 1,2 cyclohexanediol and cyclohexane dimethanol. An especially preferred diol is 1,6 hexanediol.

Any of a number of compounds known to be useful in the preparation of polyesters may be used as the carboxylic acid component according to the present invention. Such acids may be comprised of a mono-, di- or higher functionality carboxylic acid or a mixture of these carboxylic acids having carbon chains of 12 or fewer carbon units, as well as longer carboxylic acids (e.g., C36 dimer fatty acid). Monocarboxylic acids function to terminate a polyester chain and are chosen for that purpose. It is preferable that the carboxylic acid component be a dicarboxylic acid. Such preferred dicarboxylic acid compounds include, for example, adipic, azeleic, and other aliphatic dicarboxylic acids. Aromatic dicarboxylic acids may also be preferred. An especially preferred aromatic dicarboxylic acid is isophthalic acid. Alkylene and aralkylene carboxylic acids can also be used. Where branch chains in the polyester are desired, a carboxylic acid containing three or more carboxylic acid groups, for example citric acid, it used. A preferred acid of this type is trimellitic anhydride.

The polyester resins are synthesized from the above-described carboxylic acid component and an excess of the polyol component. An excess of polyol is used so that the polyester resin preferably contains terminal hydroxyl groups. The polyol compounds preferably have an average hydroxy-functionality of at least 2.

The polyester resin in most cases is comprised of one or more polyols, preferably a diol. Up to about 25 percent by weight of the polyol component may be a polyol having three or more hydroxy groups per molecule. Where polyols having three or more hydroxy groups are chosen, the result is a branched polyester.

While it is not always desirable to have a triol or higher multi-functional alcohol present because of the tendency to form a branched chain polyester, some branching may be desirable. The polyester resin should not be highly branched, however. There may also be present a small amount of monoalcohol, in the polyol component, particularly if larger proportions of higher functional alcohols are used. These monalchohols serve as chain terminators. In certain instances, for example, where certain high molecular weight polyols are used, the polyols can be largely or even entirely made up of compounds of functionality greater than two.

The resulting polyester resin is preferably produced so that the resulting polyester polyol ranges in size between about 200 and 2000 grams per equivalent of hydroxyl. Preferably, the polyester resin has a range between 700 and 800 grams per equivalent of hydroxyl and most preferably, has about 800 grams per equivalent of hydroxyl.

To produce the polyurethane resins that are useful in basecoat compositions of the present invention, the above-described polyester polyol is reacted with a mixture of a polyisocyanate, a multi-functional compound having at least one active hydrogen group and at least one water-stabilizing group, and an active hydrogen-containing capping and/or chain extending agent.

The above components may be reacted in the same pot, or may be reacted sequentially, depending upon the desired results. Sequential reaction produces resins which are more ordered in structure. Both the polyol and multi-functional compound may serve as chain extenders to build up the polyurethane backbone through reaction of hydroxyl groups with isocyanate groups. However, to function as a chain extender, the multi-functional compound must have at least two active hydrogen groups. Where the multi-functional compound has only one active hydrogen group, the result is chain termination. Additional chain extenders having at least two active hydrogen groups may be added to increase the chain length or to change the chemical characteristics of the polyurethane resin.

In general, an excess of polyisocyanate is used so that an intermediate polyurethane resin can be produced having free isocyanate groups at the terminal ends. The free isocyanate groups may then be preferably capped with trimethylol propane or diethanolamine.

The organic polyisocyanate which is reacted with the polyhydric material as described is essentially any polyisocyanate and is preferably a diisocyanate, e.g., hydrocarbon diisocyanates or substituted hydrocarbon diisocyanates. Many such organic diisocyanates are known in the art, including p-phenylene diisocyanate, biphenyl 4,4'-diisocyanate, toluene diisocyanate, tetramethylxylene diisocyanate, 3,3'-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis (phenyl isocyanate), 1,5 naphthalene diisocyanate, bis (isocyanatoethyl fumarate), isophorone diisocyanate (IPDI) and methylene-bis- (4 cyclohexylisocyanate). There can also be employed isocyanate-terminated adducts of diols, such as ethylene glycol, or 1,4-butylene glycol, etc. These are formed by reacting more than one mole of a diisocyanate, such as those mentioned, with one mole of a diol to form a longer chain diisocyanate. Alternatively, the diol can be added along with the diisocyanate.

While diisocyanates are preferred, other multi-functional isocyanates may be utilized. Examples are 1,2,4-benzene triisocyanate and polymethylene polyphenyl isocyanate.

It is preferred to employ an aliphatic diisocyanate, since it has been found that these provide better exterior weatherability color stability in the finished coating. Examples include 1,6-hexamethylene diisocyanate, 1,4-butylene diisocyanate, methylene bis (4-cyclohexyl isocyanate) and isophorone diisocyanate. Mixtures of diisocyanates can also be employed.

The proportions of the diisocyanate, long-chain aliphatic polyol, and multi-functional compound are chosen so as to provide an isocyanate-terminated intermediate polyurethane resin. This can be accomplished by utilizing a stoichiometric excess of polyisocyanate, i.e., more than one isocyanate group per nucleophilic moieties (reactive with isocyanate) in the other components.

For purposes of promoting water-solubility it is important to build water-stabilizing groups into the polyurethane. Such groups can be anionic acid groups (e.g., carboxyl groups) or nonionic groups (e.g., polyethers). For example, the presence of acid groups is capable of rendering the composition water-dilutable when neutralized.

The acids that are employed to provide free acid groups in the polyurethane resins of this invention are readily available. They contain at least one active hydrogen group and at least one carboxylic acid functionality. The active hydrogen group may be a thiol, a hydroxyl or an amine, with primary amines being considered to have one active hydrogen group. Examples of such compounds include hydroxyl carboxylic acids, amino acids, thiol acids, aminothiol acids, alkanolamino acids, and hydroxythiol acids.

Compounds containing at least 2 hydroxyl groups and at least one carboxylic acid are preferred. They can be prepared from an aldehyde that contains at least two hydrogens in the alpha position. Such aldehydes are reacted in the presence of a base catalyst with two equivalents of formaldehyde to form a 2,2-dihydroxymethyl aldehyde. The aldehyde is then gently oxidized to the acid by known procedures. The acids that are employed in the invention can be represented in simplification by Formula I:

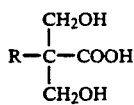

wherein R represents hydroxymethyl, hydrogen, or alkyl of up to 20 carbon atoms and preferably up to 8 carbon atoms.

Specific illustrative examples of such acids that are employed in the invention include 2,2-di(hydroxymethyl) acetic acid, 2,2,2-tri(hydroxymethyl) acetic acid, 2,2-di(hydroxymethyl) propionic acid, 2,2-di (hydroxymethyl) butyric acid, 2,2-di(hydroxymehtyl) pentanoic acid, and the like. The preferred acid is 2,2-di(hydroxymethyl) propionic acid.

The polyethers that may be utilized to nonionically impart water-solubility to the polymer are known in the art, and are described, for example, in U.S. Pat. No. 4,794,147, the disclosure of which is incorporated herein by reference. Useful polyether compounds are preferably mono or difunctional polyethers with monofunctional polyethers being preferred. The functional groups on the polyethers may be alcohol groups, thiols, amines, or mixtures of these functionalities. The monofunctional polyethers may be formed from monoalcohol-initiated polymerization of ethylene oxide, propylene oxide, and mixtures thereof. A polyether compound comprised of 100% ethylene oxide units is especially preferred. When a polyether group is used as the water-stabilizing group, it preferably comprises between 5 and 25% by weight of the final polyurethane resin and has a molecular weight of from 1000 to 3000.

Longer-chain polyurethane resins can be obtained by chain extending the polyurethane chain with a compound or mixture of compounds containing at least two active hydrogen groups but having no carboxylic acid group, for example diols, dithiols, diamines, or compounds having a mixture of hydroxyl, thiol, and amine groups, for example, alkanolamines, aminoalkyl mercaptans, and hydroxyalkyl mercaptans, among others. For purposes of this aspect of the invention both primary and secondary amine groups are considered as having one active hydrogen. Alkanolamines, for example, ethanolamine or diethanolamine, are preferably used as chain extenders, and most preferably, a diol is used. Examples of preferred diols which are used as polyurethane chain extenders include 1,6 hexanediol, cyclohexanedimethylol, and 1,4-butanediol. While polyhydroxy compounds containing at least three hydroxyl groups may be used as chain extenders, the use of these compounds produces branched polyurethane resins. For purposes of the present invention, it is preferred to minimize the amount of branching in the polyurethane resin. Therefore, if polyhydroxy compounds are used, they are preferably limited to a very minor component of the polyurethane producing mixture. These higher functional polyhydroxy compounds include, for example, trimethylolpropane, trimethylolethane, pentaerythritol, among other compounds.

The polyurethane resin may be chain extended in any manner using these compounds having at least two active hydrogen groups. Thus, these compounds may be added to the mixture of polyisocyanate, polyol, and multi-functional compound, or alternatively, may react at an intermediate stage, to link two free isocyanate groups that are present at the terminal ends of an intermediate polyurethane resin.

It is generally preferred that an intermediate polyurethane resin produced by reacting the long-chain aliphatic polyol and the mixture of polyisocyanate, multi-functional compound containing at least 2 hydroxyl groups and one water-stabilizing group, and the chain be terminated with free isocyanate groups. To accomplish this, an excess of the polyisocyanate component is used. Of course, the molar ratio of the other components will be adjusted according to the desired characteristics of the intermediate and final polyurethane resins. The long-chain aliphatic polyol component should comprise no more than about 80% by weight of the reaction mixture and it is preferred that the polyol component comprises from about 65% to about 75% by weight of reactants in the mixture.

In one especially desirable embodiment of the invention, a multi-functional alcohol is used to terminate the reaction (cap the free isocyanate groups) at the desired stage (determined by the viscosity and concentration of isocyanate groups present), thereby also contributing residual hydroxyl groups. Particularly desirable for such purposes are aminoalcohols, such as ethanolamine, diethanolamine and the like, since the amino groups preferentially react with the isocyanate groups present. Multi-functional alcohols, such as ethylene glycol, trimethylolpropane and hydroxyl-terminated polyesters, can also be employed in this manner.

While the ratios of the components of the polyol, the multi-functional isocyanate and the terminating agent can be varied, it will be noted by those skilled in the art that the amounts should be chosen so as to avoid gellation and to produce an ungelled urethane reaction product containing hydroxyl groups. The hydroxyl value of the urethane reaction product should be at least 5 and preferably about 20 to about 200.

The amount of polyisocyanate used in the mixture is preferably between about 20% and 30% by weight of the reactants in the mixture, but will vary depending upon the polyester used, the acid number of the final polyurethane resin (if anionic water stabilizing groups are used), and the desired molecular weight of the final polyurethane resin, as well as other factors known in the art. The amount of polyisocyanate will also vary depending upon whether it is desired to have the intermediate polyurethane terminated with free isocyanate groups or with hydroxyl groups. Thus, where it is preferred to terminate the intermediate polyurethane resin with free isocyanates for capping with trimethyolpropane or diethanolamine, an excess of polyisocyanate may be used. Where the intermediate polyurethane resin is to be terminated by hydroxyl groups, a stoichiometric deficiency of polyisocyanate may be used.

When the polyurethane utilizes acid water-stabilizing groups, the amount of multi-functional component having at least one active hydrogen group and at least one water-stabilizing group may vary depending upon the desired acid number of the final polyurethane resin. If the water-stabilizing group is an acid group, the final polyurethane resin should have an acid number of at least about 10, and the amount of this multi-functional component comprises between about 1% and about 25% by weight of the reactants of polyurethane producing reaction mixture (polyisocyanate, polyol, multifunctional compound, and optionally other chain extenders, for example compounds having two active hydrogens but no carboxylic groups). It is preferable that the acid number be higher, because as the acid number increases, the water-dispersibility of the polyurethane resin potentially increases. The practical upper limit of acid number is that which negatively effects the low flash or quick-drying characteristics of the final resin. Of course, the upper limit of the acid number will vary depending upon the chemical composition of the final polyurethane resin, but an acid number of about 100 is, in general, the practical limit of polyurethane resins of the present invention.

The amount of chain extender, when used producing the polyurethane resin, varies between about 2% and 25% by weight of the reactants. The amount used will depend upon the amount of chain extension desired and the desired molecular weight of a polyurethane molecule.

After the polyurethane resin is synthesized, a portion of the carboxylic acid groups is neutralized with base to form salt groups. Preferably, the base is an amino containing compound. Tertiary amines are generally preferred over primary and secondary amines because of the tendency of the primary and secondary amines to react with aminoplast cross-linking agents. Preferred tertiary amines include tri-alkylamines, for example, trimethyl and triethylamine. Also preferred is triethanolamine. Particularly preferred is dimethylethanolamine.

The polyurethane resins of the present invention are formulated, along with other components, into water dispersible basecoat compositions which are sprayed or electrostatically deposited onto metal or plastic substrates, for example, automobile bodies. In general, a polyurethane resin formulated as described herein, is mixed with an aminoplast resin, a pigment grind resin, water, a portion of organic solvents, aluminum and/or mica particles and a rheology control agent. Other agents may be included, for example, various fillers, surfactants, plasticizers, stabilizers, wetting agents, dispersing agents, defoamers, adhesion promoters and catalysts in minor amounts. In one preferred embodiment a branched-chain polyester component is also added to the basecoat composition.

As indicated, an aqueous dispersion of the polyurethane resin is utilized as the principal or major vehicle resin. In general, the principal or major vehicle resin comprises between about 20 and 80% by weight of the total solids present in the basecoat composition.

The polyurethane reaction product as described above can be mixed with an aminoplast resin in order to form a curable coating composition. Aminoplast resins are aldehyde condensation products of melamine, urea, and similar compounds. Products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine acetoguanamine, ammeline, 2-chloro-4,6-diamino-1,3,5-triazine, 6-methyl-2,4-diamino,1,3,5-triazine, 3-5-diamino-triazole, triaminopyrimidine, 2-mercapto-4,6-diaminopyrimidine, 2,4,6-triethyl triamino-1,3,5-triazine, and the like.

While the aldehylde employed is most often formaldehyde, other similar condensation products can be made from other aldehydes, for example, acetaldehyde, crotonaldehyde acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and aromatic alcohols, cyclic alcohols, for example, cyclohexanol, monoethers or glycols such as Cellosolves and Carbitols ® (Union Carbide), and halogen-substituted or other substituted alcohols, such as 3-chloropropanol. The preferred amine-aldehyde resins are etherified with methanol or butanol.

A pigment grind resin is often useful in order to incorporate pigments into coating compositions according to the present invention. While the pigment resin may be comprised of a number of water soluble polyurethane resins, it is it may be desirable that the grind resin be similar in chemical character to the principal or major vehicle resin. The grind resin may range between about 2 and about 25% by weight of the total solids in the coating composition and preferably contains about 5–40% by weight of the basecoat composition.

Pigments may be incorporated into the basecoat to provide the desired cosmetic characteristics. This is done by mixing pigments with the above-described pigment grind resin to form a pigment paste. Any standard pigment known in the art may be used with resins of the present invention so long as these pigments can be formulated without affecting the desired low flash and quick-drying characteristics. Specific examples of the dyestuffs or pigments may be inorganic or organic, for example, graphite, carbon black, zinc chromate, strontium chromate, barium chromate, lead chromate, titanium dioxide, zinc oxide, cadmium sulfide, iron oxide, aluminum flakes, zinc sulfide, phthalo cyanine complexes, naphthol red, quinacridones and halogenated thioindigo pigments, among others.

Many preferred pigments are preferably mixed with aluminum metal flakes. Preferred aluminum flake pigments are available from Silberline Corp, Lansford, Pa. or from Eckart Werke, Gunterstahl, West Germany. The aluminum flake pigments provide the coating with an enhanced "metallic veneer". In a preferred embodiment of the present invention standard grade aluminum stabilized with phosphate ester is used. Other metallic flake pigments, for example, silver may also be used, but these are usually prohibitive in cost and inferior in appearance. The metallic pigments may also be mixed with non-metallic pigments.

The resinous dispersions of the basecoat in compositions are dispersed in deionized water. It is preferred that the deionized water have conductance readings of less than 13 microohms-1 and most preferably less than about 5 microohms-1 to prevent gassing caused by the reaction of aluminum with water, and to improve the stability of the anionic resin dispersions or other anionic addenda. Deionized water is also chosen to avoid salts that naturally occur in tap water. Other solvents may also be employed with the deionized water. An especially preferred solvent is Butyl Cellosolve ® which aids mixing, formulating and dispersing pigments in the basecoat composition.

Auxiliary solvents such as polar organic solvents can also be used in the compositions according to the present invention. Such solvents include, for example, low-boiling mono and polyhydric alcohols, ethers, esters, ketones and other organics. Such solvents, which comprise at most about 80% of the basecoat composition, and preferably comprise about 10% to 20% by weight of the basecoat composition (including water) may be selected to promote the dispersibility of individual components in the final basecoat composition (plasticizer characteristics) and for its low volatility characteristics.

A rheology control agent is also preferably incorporated into the basecoat composition. The rheology control agent controls the viscosity of the resulting composition and is incorporated in amounts that will prevent sagging or running after a basecoat is sprayed onto a vertical surface such as an automobile body. The direct result of incorporating a rheology control agent is to provide flow control, body and sprayability. Other favorable results of adding a rheology control agent are to of metallic flake pigments and to deposit a thicker coating and complete coverage of a substrate. The sprayed coatings containing these agents also exhibit greater orientation of the flake pigments on the final coated substrate. Rheology control agents which can be used in embodiments of the present invention include the fumed silica compounds and the bentonite clays. Preferred fumed silica compounds are the hydrophobic silica compounds, for example Aerosil R972, available from DeGussa Corporation, (Frankfurt, West Germany). Another rheology control agent which may be used, and in certain basecoat compositions, may be preferred is a synthetic sodium lithium magnesium silicate hectorite clay. An example of one such clay is Laponite RD, available from Laporte, Inc (Saddlebrook, Jersey). In certain preferred embodiments rheology control agents are mixed. The rheology control agent when it is included, generally comprises about 0.1 to about 20 percent by weight of the basecoat composition and preferably comprises between about 1 percent and about 5 percent by weight of the final basecoat composition.

In general, the particle size of the rheology control agent plays a role in the overall thixotropic properties of these resins. Rheology control agents in embodiments of this invention are suspended in water and incorporated into the coating compositions of the invention.

In general, the particle sizes can be from less than 0.1 microns to over about 200 microns. These sizes can be adapted to develop in part the rheological properties sought. In appropriate circumstances, the particle sizes may be from about 1 to about 50 microns.

In addition to a principal resin or major vehicle resin and a grind resin, preferred basecoat compositions may preferably comprise at least 5% by weight of the resinous vehicle of a branched-chain polyester resin. The branched-chain polyester is added for improved application properties and improved physical properties (due to increased cross-link density). Such branch-chain polyesters are described in U.S. Pat. No. 4,791,168, the disclosure of which is incorporated herein by reference.

Any additional agent used, for example, surfactants, fillers, stabilizers, wetting agents, dispersing agents, adhesion promoters, etc. may be incorporated into the basecoat composition. While the agents are well-known in the prior art, the amount used must be carefully controlled to avoid adversely affecting the coating and quick-drying characteristics.

In formulating the basecoat compositions of the present invention, the order of addition of the individual components is often very important. As a rule, the cross-linking agent in a solvent is added to the rheology control agent in solution and thoroughly mixed. Thereafter, the major vehicle resin dispersion (neutralized with dimethylethanolamine) is added to the rheology control solution under agitation. A slurry of aluminum metal flakes and/or mica particles (mica particles are used alone in the case where an aluminum metallic veneer is not desired) is added to a mixture of a branched-chain polyester and Butyl Cellosolve ®, and then dimethylethanoamine is added. This mixture of aluminum is then agitated with the slurry containing resinous vehicle, cross-linking agent, and rheology control agent. Pigment pastes comprised of polyurethane resin or other suitable dispersing vehicle, pigment, fillers, stabilizers, plasticizers and other additives are then mixed under agitation with the above-resulting mixture. Pigment paste particles are prepared in a sand mill, attritor, or other common milling equipment prior to use.

The pigments pastes may be prepared by mixing the aminoplast resin with the about ¼ of the total polyurethane resin (grind resin NV about 28%) to be added to the pigment paste. Pigment is added to this slurry under agitation for about ½ hour. The rest of the polyurethane resin is then added and the resulting paste is mixed for another half-hour. The pH and viscosity of the paste are checked and any adjustments are made by adding deionized water and/or tertiary amine. The weight ratio of pigment to binder ranges between 0.05-5.0. The final pigment paste comprises about 60% binder and pigment and about 40% aminoplast resin (solids basis). The amount of pigment ranges between 6 and 60% of the total weight of pigment plus binder. Other well-known methods of formulating prepared prepaint pastes may also be used.

If neutralized acid groups are utilized as the water-stabilizing groups for the polyurethane, the final basecoat composition is adjusted to a pH of 7.6-7.8 with a basifying agent such as dimethylethanolamine. In the case of nonionic water-stabilizing groups, pH adjustment is generally not needed. Viscosity may be adjusted using deionized water. Final basecoat compositions are comprised of the following components in the indicated weight ratios.

TABLE I

| Ingredient | Amount (% by weight of Solids of Final Basecoat composition) |
|---|---|
| Polyurethane resin | 20-80% |
| Melamine | 5-50% |
| Rheology Control Agent | 0-20% |
| Branched chain Polyester | 0-35% |
| Pigment (Includes Aluminum Flakes) | 0-20% |
| Pigment Paste | 5-40% |

The basecoat compositions described hereinabove can be applied to a metal or plastic substrate in one or two coats using for example an air atomizer (Binks Model 60 spray gun, available from Binks Manufacturing Corporation, (Franklin Park, Ill.), or by using other conventional spraying means. The basecoat compositions may also be applied electrostatically. The basecoat compositions are preferably sprayed at a 50-80 psi, and a relative humidity of between 50 and 90% (optimally at 60-80% relative humidity) and a temperature of 21°-32° C.

After being deposited, the basecoat compositions are flash dried within a temperature range of room temperatures to 63° C. for between 30 seconds and about 10 minutes using warm air blowing at a relative humidity of 5-40%. The preferred flash temperature is about 49° C., which is carried out for preferably between about 1 and 5 minutes. The flash conditions described herein result in about 90% of the solvents (water plus organics) being flashed from the basecoat in this short period of time.

After the first basecoat is deposited, a second layer of basecoat can be deposited over the first without drying (flash off), or alternatively, a topcoat (e.g., a clearcoat) may be deposited after a brief flash step. Any number of clearcoat compositions known in the art may be used. Any known unpigmented or other transparently pigmented coating agent is in principle, suitable for use as a topcoat. A typical top coat composition contains 30-60% film forming resin and 40-70% volatile organic solvent.

After the clear coat is coated onto the basecoat layer, the multi-layer coating is then baked to cross-link the polymeric vehicle and to drive the small amount of residual water and organic solvent from the multi-layered polymeric composition. A preferred baking step involves heating the coated substrate for a period of 10-60 minutes at a temperature of between 66° C. and 149° C. The baking step cures the coating to a hard, durable film.

The invention will be further described in connection with several examples that follow. These examples are shown by way of illustration of the invention and are not meant to limit the scope of the invention. All parts and percentages in the examples are by weight unless otherwise indicated.

PREPARATION 1 - POLYESTER POLYOL

C36 dimer fatty alcohol (1650.0 g) (Pripol® 2033, Unichema), 1,6-hexanediol (499.6 g), isophthalic acid (488.2 g), and adipic acid (362.2 g) were mixed in a reaction flask fitted with a fractionating column and heated slowly to 220° C. Water was removed from the reaction mixture, and the reaction was held at 220° C. until the acid number was less than 6 to yield the polyester polyol.

PREPARATION 2 - ANIONIC POLYURETHANE RESIN

The following ingredients were mixed in a 5 liter reactor and heated to 113° C.:

| | |
|---|---|
| Polyester from Preparation 1 | 700.0 g |
| dimethylol propionic acid | 43.0 g |
| neopentyl glycol | 14.7 g |
| isophorone diisocyanate | 242.4 g |
| methylpentyl ketone (solvent) | 163.9 g |
| methylethyl ketone (solvent) | 41.0 g |

The reaction mixture was held at this temperature until the residual NCO was less than 1%. Trimethylol propane (43.4 g) was added to cap the urethane. The reaction was maintained until the residual NCO was less than 0.1%. Dimethylethanol amine (28.6 g) was added to salt the resin. Butanol (121.7 g) was added as a cosolvent, and the mixture was dispersed in 2466.0 g of deionized water. The resulting resin dispersion had a GPC molecular weight of 36,000, a weight % nonvolatiles of 27.0%, and a mean particle size of 87 nm.

PREPARATION 3 - NONIONIC POLYURETHANE RESIN

The following ingredients were mixed in a 5 liter reactor and heated to 113° C.:

| | |
|---|---|
| polyester polyol from Preparation 1 | 1013.0 g |

| -continued | |
|---|---|
| methoxy polyethylene glycol (MW = 2000) | 222.7 g |
| trimethylol propane | 20.1 g |
| isophorone diisocyanate | 248.1 g |
| methylpentyl ketone (solvent) | 260.7 g |

The reaction mixture was held at this temperature until the residual NCO was less than 1%. A mixture of trimethylol propane (13.3 g) and neopentyl glycol (17.4 g) was added to cap the urethane. The reaction was maintained until the % residual NCO reached 0.1%. Butyl Cellosolve (403.9 g) was added as a cosolvent, and the mixture was cooled to 60° C. and dispersed in 1600.8 g deionized water. The resulting polyurethane resin dispersion had a GPC molecular weight of 18,000, a weight % nonvolatiles of 40.0%, and a mean particle size of 133 nm.

EXAMPLE 1

The resin of Preparation 1 was incorporated into a waterborne basecoat according to the formulation set forth below. The amounts are given as parts by weight. The values for # Pigment and # Vehicle represent relative parts by weight of solids (nonvolatiles). The values for 100 # represent relative parts by weight of volatiles and non-volatiles, normalized to a total of 100 parts by weight.

| Waterborne Basecoat Formulation 1 | | | |
|---|---|---|---|
| | # Pigment | # Vehicle | 100 # |
| A) Laponite ® | 4.00 | | |
| Pluracol ® P1010 | | 0.80 | |
| deionized water | | | |
| Total for A | | | 30.39 |
| B) Cymel ® 327 melamine resin | | 20.00 | 4.22 |
| Butyl Cellosolve ® | | | 1.06 |
| C) Resin from Preparation 1 | | 60.00 | 42.06 |
| D) Tinuvin ®1130 | | | 0.28 |
| E) Aluminum pigment paste | 15.00 | | 4.39 |
| Butyl Cellosolve ® | | | 2.03 |
| branched polyester derived from C36 dimer fatty acid, isophthalic acid, 1,6-hexanediol, and trimellitic acid (73% solids) | | 20.00 | 5.20 |
| 20% dimethyl ethanol amine in deionized water | | | 0.56 |
| F) dimethyl ethanol amine | | | 0.13 |
| G) Butyl Cellosolve ® | | | 0.49 |
| H) deionized water | | | 9.17 |

When the above basecoat composition was sprayed onto a primed steel panel, flashed, and overcoated with an industry standard acrylic melamine clearcoat prior to cure, satisfactory coating results were obtained with a basecoat flash of only 8 minutes at 49° C.

EXAMPLE 2

The resin of Preparation 2 was incorporated into a waterborne basecoat according to the formulation set forth below. The amounts are given as parts by weight. The values for # Pigment and # Vehicle represent relative parts by weight of solids (nonvolatiles). The values for 100 # represent relative parts by weight of volatiles and non-volatiles, normalized to a total of 100 parts by weight.

| Waterborne Basecoat Formulation 2 | | | |
|---|---|---|---|
| | # Pigment | # Vehicle | 100 # |
| A) Laponite ® | 2.00 | | |
| Pluracol ® P1010 | | 2.00 | |
| deionized water | | | |
| Total for A | | | 16.33 |
| B) Resimene ® 747 melamine resin | | 33.70 | 8.25 |
| Butyl Cellosolve ® | | | 2.06 |
| C) Resin from Preparation 2 | | 20.50 | 12.42 |
| D) Fumed silica | 4.75 | | |
| grind resin | | 5.17 | |
| Resimene ® 747 | | 2.30 | |
| Total for D | | | 9.57 |
| E) Red pigment | 18.70 | | |
| Resin from Preparation 2 | | 24.40 | 2.00 |
| Total for E | | | 24.88 |
| F) Violet pigment | 3.60 | | |
| Resin from Preparation 2 | | 14.90 | |
| Total for G | | | 12.59 |
| G) Tinuvin ® 1130 | | | 0.37 |
| H) Nacure ® 2500 | | | 1.30 |
| I) Butyl Cellosolve ® | | | 0.71 |
| J) Deionized water | | | 11.53 |

When the above basecoat composition was sprayed onto a primed steel panel, flashed, and overcoated with an industry standard acrylic melamine clearcoat prior to cure, satisfactory coating results were obtained with a basecoat flash of only 8 minutes at 49° C.

The invention has been described in detail with reference to preferred embodiments thereof. It should be understood, however, that variations and modifications can be made within the spirit and scope of the invention.

We claim:

1. A coating composition comprising:
   (a) an aqueous medium,
   (b) an water-dispersible polyurethane resin that is the reaction product of a mixture comprising:
   (1) a hydroxy-functional polyester component that is the reaction product of a mixture comprising a carboxylic acid component comprising at least two carboxylic acid functional groups, a C36 dimer fatty alcohol, and a short-chain polyol having 12 or fewer carbon atoms,
   (2) a multifunctional compound having at least one active hydrogen group and at least one water-stabilizing group,
   (3) an active hydrogen-containing capping or chain extending agent, and
   (4) a polyisocyanate, and
   (c) an aminoplast crosslinking agent.

2. A coating composition according to claim 1 wherein at least one of the active hydrogen groups on the multifunctional compound (b) (2) is a hydroxyl group.

3. A coating composition according to claim 1 wherein the compound (b) (3) is a polyol.

4. A coating composition according to claim 1 wherein the compound (b) (3) is an aminoalcohol.

5. A coating composition according to claim 1 wherein the carboxylic acid component has less than or equal to 12 carbon atoms.

6. A coating composition according to claim 1 wherein the carboxylic acid component has greater than or equal to 18 carbon atoms.

7. A coating composition according to claim 1 wherein the carboxylic acid component of (b) (1) is a diacid or mixture of diacids.

8. A coating composition according to claim 6 wherein the short-chain polyol has 7 or fewer carbon atoms.

9. A coating composition according to claim 1 wherein the short-chain polyol has 7 or fewer carbon atoms.

10. A coating composition according to claim 1 wherein the cross-linking agent is a melamine resin.

11. A coating composition according to claim 1 wherein the polyisocyanate is an aliphatic diisocyanate.

12. A coating composition according to claim 1 wherein
the polyurethane resin is present in an amount of 20–90% by weight, based on the final solids content of the coating composition, and the aminoplast crosslinking agent is present in an amount of 5–50% by weight, based on the final solids content of the coating composition.

13. A coating composition according to claim 1 wherein
the polyester component (1) is present in the mixture (b) in an amount of 40–85%, based on the final solids content of the mixture (b),
the multifunctional compound (2) is present in the mixture (b) in an amount of 1–10%, based on the final solids content of the mixture (b),
the compound (3) is present in the mixture (b) in an amount of 1–10%, based on the final solids content of the mixture (b), and
the polyisocyanate (4) is present in the mixture (b) in an amount of 10–40%, based on the final solids content of the mixture (b).

14. A coating composition according to claim 1, further comprising at least one pigment.

15. A coating composition according to claim 12 wherein the pigment is part of a polyurethane grind paste composition.

16. A coating composition according to claim 13 wherein the polyurethane grind paste composition comprises:
6 to 60%, based on the final solids content of the grind resin composition, of the pigment,
20 to 75%, based on the final solids content of the grind resin composition, of a polyurethane resin that is the reaction product of a mixture comprising:
(i) a hydroxy-functional polyester component that is the reaction product of a mixture comprising a carboxylic acid component comprising at least two carboxylic acid functional groups, a C36 dimer fatty alcohol, and a short-chain polyol having 12 or fewer carbon atoms, and
(ii) a mixture of a multifunctional compound having at least one active hydrogen group and at least one water-stabilizing group, a compound having at least two active hydrogen groups, and a polyisocyanate,
and an aminoplast crosslinking agent.

17. A coating composition according to claim 1, further comprising a branched polyester resin that is the reaction product of a mixture comprising:
(1) a hydroxy-functional polyester component, and
(2) 2–25% by weight of a polyfunctional carboxylic acid or acid anhydride, having at least 3 carboxylic acid groups.

18. A coating composition according to claim 1 wherein the water-stabilizing group is a neutralized carboxylic acid group.

19. A coating composition according to claim 1 wherein the water-stabilizing group is a polyether group.

* * * * *